Figure 1:
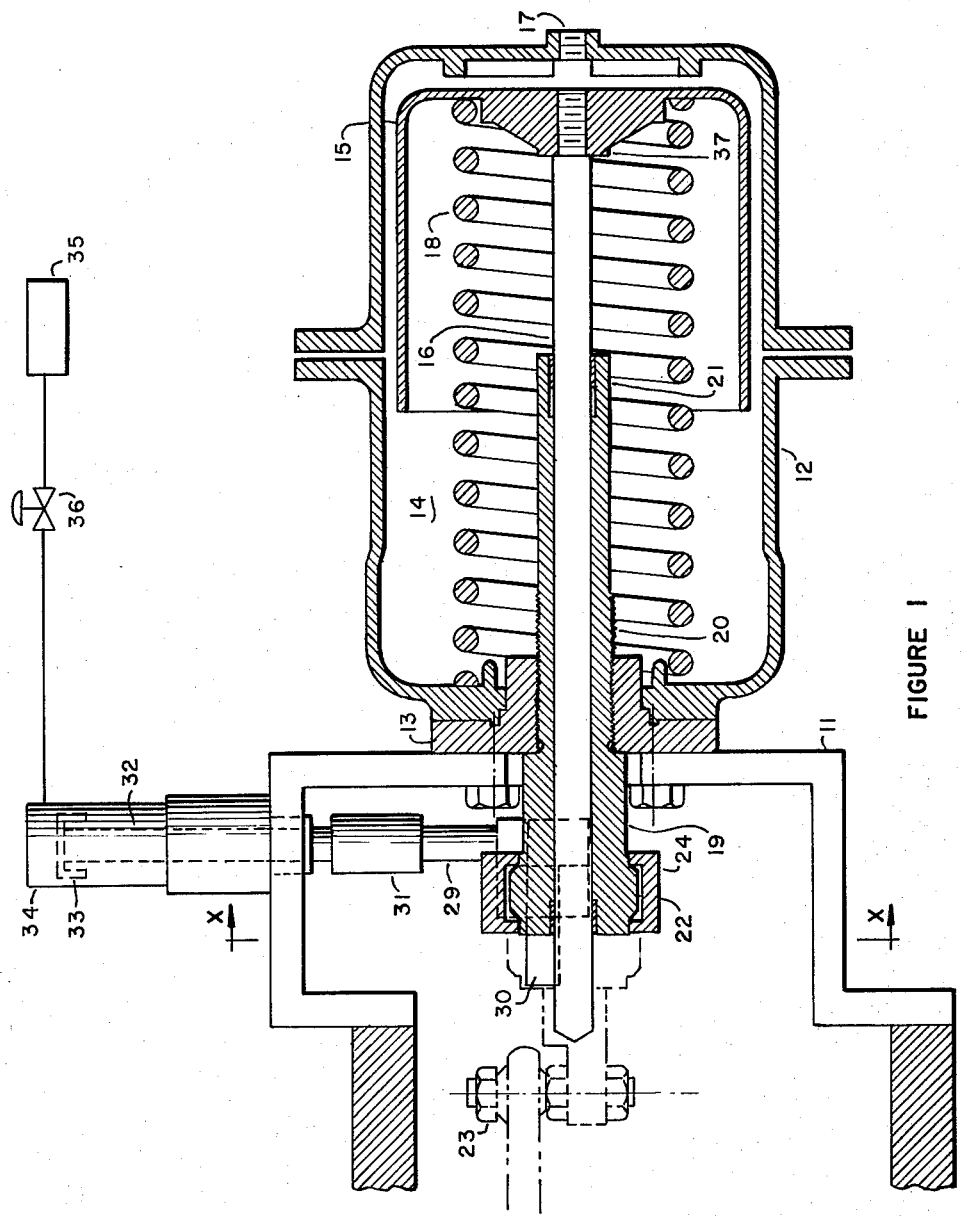

United States Patent Office 3,245,325
Patented Apr. 12, 1966

3,245,325
ADJUSTABLE LIMIT STOP FOR HIGH
PRESSURE VALVE
Aniceto L. Giusti, Jr., Dickinson, and Edward J. Opersteny, Texas City, Tex., assignors to Monsanto Company, St. Louis, Mo., a corporation of Delaware
Filed Jan. 2, 1964, Ser. No. 335,254
3 Claims. (Cl. 92—13)

This application is a continuation-in-part of application Serial No. 69,141, filed November 14, 1960, now abandoned.

This invention relates to an adjustable limit stop for a high pressure valve operator. More particularly, this invention relates to an apparatus for remotely adjusting the limit stop of an air-operated motor used to open and close a high-pressure throttling valve.

Of the various chemical processes in which the use of a large throttling valve to control a high pressure flow is used, the manufacture of polyethylene is the most widely known. Polyethylene is most effectively produced by subjecting ethylene to the polymerizing action of elevated temperatures and high pressures, usually at least 5,000 pounds per square inch and often as high as 60,000 pounds per square inch.

The polymerization of ethylene is highly exothermic. In order to produce a commercially valuable polyethylene product as a reasonable rate, it is often desirable to effect the ethylene polymerization at reaction conditions that provide a rapid polymerization under conditions which are only slightly less severe than those causing an uncontrolled polymerization in the nature of an explosion resulting in decomposition of ethylene and polyethylene to form free carbon in the reactor. One method to obtain practical reaction and production rates is to pass ethylene and a catalyst, such as oxygen, continuously through an elongated tube. Under such circumstances, exceedingly close control is required. However, in practice it is found that the operation of the reactor may be lined out at constant pressure for a period of time, and when the process has apparently reached steady state conditions, an uncontrollable explosive polymerization occurs without apparent reason, resulting in sharp increase in temperature and in the formation of elemental carbon in the reactor and process streams. This results in a very serious loss of production and also contaminates the product being collected.

It has also been found difficult to operate the polyethylene process continuously under conditions for making good product without serious fluctuation in pressure occurring from time to time. Corresponding temperature fluctuations also occur; the reaction temperature being partly related to and dependent upon the reaction pressure. The pressure fluctuation usually takes the form of a greatly increased pressure drop across the first part of the reactor tube; that is, in the part of the reactor tube nearest the ethylene inlet, followed sooner or later by a very sudden decrease in the pressure drop across this section. This pressure drop is followed immediately by a sharp increase in reaction temperature.

A recent process which is at least a partial solution of these pressure fluctuation and decomposition problems is disclosed and claimed in U.S. Patent 2,852,501. That process provides for imposing on the flowing reaction mixture marked flow pulses of such frequency and magnitude as to prevent irregular changes in pressure drop and flow rate originating in the tube from causes other than said pulses and assuring prolonged continuous operation in the process with consistently regular temperature patterns along the tube. This is based on the theory that regular and externally imposed flow pulses accomplish a regular tearing away of accumulated polymer from the reactor walls to a sufficient extent to avoid plugging or bridging conditions which would cause the aforementioned irregular changes in the reaction conditions. It is also believed that prompt and regular initiation of reaction in the incoming ethylene plus initiator is effected by the flow pulses.

In U.S. Patent 2,852,501, the pressure flow pulses are obtained by operation of a let-down valve at the exit end of the tubular reaction zone. The pressure in the reaction tube is dropped very abruptly by means of this let-down valve, for example, from a standard operating pressure of 30,000 pounds per square inch in the reaction tube down to a pressure of 5,000 pounds per square inch in the separate zone. This is done by suitable opening and closing of the let-down valve. In all cases where this let-down valve operation is practiced, the valve will be sharply opened so as to cause a very rapid drop in pressure in the reaction tube. This, of course, results in a corresponding increase in the pressure drop across those portions of the tube in which flow is most restricted by polymer accumulation and an increase in flow rate of the reaction mixture through all portions of the tube. The total pressure is allowed to drop to an extent which may, for example, amount to 10% or more of the total pressure. For instance, with a polyethylene process operating at 30,000 p.s.i., the pressure may be approximately instantaneously dropped to 25,000 p.s.i. After this occurs, the valve is then immediately closed and maintained in the closed position until the pressure in the reaction tube builds back to the former pressure which is the standard operating pressure of the process, that is, 30,000 p.s.i. in the example cited. The cycle can be considered completed at the instant the standard operating pressure is obtained and the cycle then immediately repeated by again opening the valve. The procedure described is continued indefinitely. The time elapsing from a given portion of the cycle to the same portion of the next cycle is termed the frequency of the cyclic operation. The duration of the maximum opening of the let-down valve will be only sufficient to obtain the desired drop in pressure and increase in velocity, while the duration of the period during which the valve is closed or partially closed, will be dependent upon the temperature response of the flowing ethylene reaction mixture and the frequency required of the cyclic operation to obtain consistently regular, though cyclic, operation over an extended period of time.

Frequently, the valve used in this cyclic operation will become worn, because of erosion of the stem plug or valve seat, and will not close completely on each cycle. This results in slower response in bringing the pressure up to the normal operating pressure after each let-down. To remedy this condition, the polymerization reactor must be shut down and the valve stem adjusted by hand to close the stem plug tightly against the valve seat upon the proper signal. This necessarily means additional costs because of the down-time as well as repair or adjustment costs on the valve itself. In addition, let-down valves are often damaged when the valve stems are over-adjusted for full closing and the valve stem and plug slams against the valve seat before the valve operator has reached its full travel. For instance, the valve stem, valve plug, or valve seat may crack due to the closing force, particularly since the materials of construction are generally of extremely hard and brittle metal alloys in order to reduce erosion.

An object, therefore, of this invention is to provide a high pressure let-down valve operator having an adjustable limit stop to remotely adjust the travel of the valve operator of a high-pressure let-down valve and thereby allow the valve stem to close the valve plug completely against the valve seat. A further object is to provide an apparatus to remotely adjust the distance of travel of a high pressure let-down valve operator without taking the valve out of operation. These and other objects of the invention will become apparent from the following description.

According to the present invention, there is provided an apparatus for adjusting the extent of travel of the valve stem of a throttling valve, said apparatus comprising a first fluid actuator means having a movable barrier means within a fluid tight casing, said barrier means being movable under the influence of a fluid pressure differential, a shaft operatively connecting through the wall of said casing to the valve stem of said valve and to said movable barrier to impart motion to said valve stem, an elongated sleeve means adjustably threaded into the wall of said fluid tight casing for receiving said shaft, one end of said elongated sleeve means being a stop means in spaced relation to one end of said fluid tight casing to define the extent of movement of said shaft and the other end of said elongated sleeve means being a driving means for threadably adjusting said elongated sleeve means along the length of said shaft and thereby change the spaced relation of said stop means within said fluid tight casing to limit the movement of said shaft, and a second fluid actuator means mechanically coupled to said driving means to threadably adjust said elongated sleeve means as desired. In one embodiment of the invention, the apparatus constitutes an adjustable limit stop for a high pressure throttling valve operator. The limit stop is a cylindrical device in axial relationship with the valve operator drive shaft and in threaded relationship to the casing of the valve operator and with a multi-tooth ratchet gear at one end and a stop means at the opposite end thereof, said ratchet gear attached to means for rotating said ratchet gear and thereby adjust the position of the valve operator limit stop.

Figure 2:
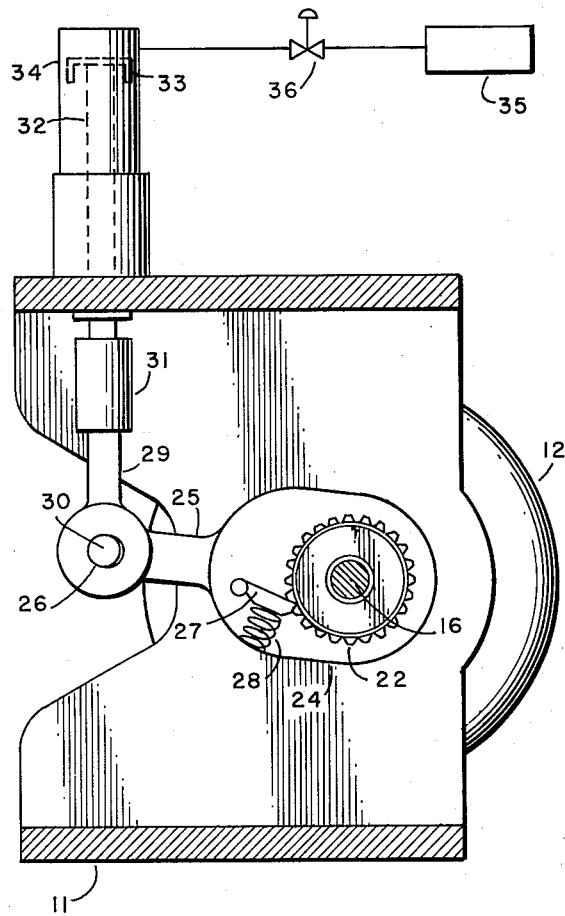

In the accompanying drawings, FIGURE 1 is a sectional-view of a let-down valve operator of this invention showing the adjustable limit stop. FIGURE 2 is a sectional-view taken along the line X—X in FIGURE 1 of the apparatus for remotely adjusting the valve operator limit stop.

Referring to FIGURES 1 and 2, motor base frame 11 has attached thereto air motor casing 12. Adjusting collar 13 separates air motor casing 12 from motor base frame 11. Air motor casing 12 contains air cylinder 14 and air piston 15 having piston shaft 16 attached thereto. The reciprocation of piston 15 within cylinder 14 is determined by the action of air introduced through nozzle 17 in casing 12 against piston 15 and the resistance of compression spring 18. Piston 15 is mounted within cylinder 14 by means of elongated sleeve 19 which is threadably attached to adjusting collar 13 between motor base frame 11 and air motor casing 12 and which projects into both motor base frame 11 and air motor casing 12. Sleeve 19 has threads 20 near the mid-point thereof for adjustable attachment to adjusting collar 13 and is provided with piston limit stop 21 to limit reciprocation of piston 15 by contact against piston shoulder 37 on the end projecting into cylinder 14, and ratchet gear 22 on the end projecting into motor base frame 11. The extent of projection of sleeve 19 into motor base frame 11 and cylinder 14 is determined by the degree to which sleeve 19 is threaded into adjusting collar 13 on threads 20. The end of piston shaft 16 projecting into motor base frame 11 is mechanically attached to the valve stem of the valve (not shown) by means of mechanical linkage 23.

Referring more specifically to FIGURE 2, ratchet gears 22 on the end of sleeve 19 are enclosed by ratchet housing 24 upon which is mounted pivot arm 25 having elongated hole 26 in the end thereof. Ratchet pawl 27 is located in ratchet housing 24 and maintained in contact with ratchet gears 22 by means of spring 28. Pivot arm 25 is mechanically connected to eyebolt 29 by means of connecting pin 30 whereby pivot arm 25 cannot only rotate on connecting pin 30 but can only also move longitudinally with respect to eyebolt 29. Eyebolt 29 is mechanically connected through coupling 31 and shaft 32 to piston 33 in air motor 34 which is operated by means of air source 35 in accordance with the action of control valve 36.

In the operation of the apparatus of this invention, air pressure applied through nozzle 17 to air motor casing 12 reciprocates piston 15 within cylinder 14 to close the valve seat of a high pressure let-down valve. The extent to which the valve seat is closed is determined by the extent to which sleeve 19 projects into cylinder 14 to position piston limit stop 21 within cylinder 14. Piston 15 can travel only until piston shoulder 37 contacts piston limit stop 21. When it is desired to change the distance of travel of piston 15, valve 36 is opened to supply air pressure to air motor 34 to force piston 33 downward. The downward action of piston 33 results in the downward movement of eyebolt 29 which rotates pivot arm 25 and ratchet housing 24. The rotation of ratchet housing 24 engages ratchet pawl 27 in ratchet gear 22 and rotates sleeve 19 in threaded collar 13 a distance equal to one tooth of ratchet gear 22. The rotation of sleeve 19 results in the longitudinal movement of piston limit stop 21 a distance of 0.0035 inch. The longitudinal movement of sleeve 19 also results in the longitudinal movement of pivot arm 25 on connecting pin 30.

Although the movable barrier means is shown as a piston in FIGURES 1 and 2, this element may, if desired, be a diaphragm.

*Example I*

Polyethylene produced in a tubular reactor at 30,000 p.s.i. and 250° C. and unreacted ethylene gas were released from the reactor through a one-half inch high pressure let-down valve to enter a separator maintained at 3,000 p.s.i. The let-down valve was opened once each minute for the time required for the pressure in the reactor to drop to 25,000 p.s.i. and then closed. The pressure built back up to 30,000 p.s.i. in about 15 seconds at the beginning of the run. After approximately 48 hours of operation, the time required to attain the 30,000 p.s.i. after a drop to 25,000 p.s.i. was 25 seconds. Air motor 34 in FIGURES 1 and 2 was activated by throwing remote air valve 36 for three successive strokes to rotate ratchet gear 22 three teeth. Piston limit stop 21 moved along shaft 16 a distance of about 0.01 inch thereby allowing piston 15 to close-off completely the high pressure let-down valve after each let-down cycle. The time required to attain 30,000 p.s.i. in the reactor after a let-down to 25,000 was then 16 seconds.

It is obvious from the foregoing example that the remote adjustable limit stop for the valve operator of a high pressure let-down valve provides for a great improvement in the maintenance of high pressure valves and a superior means for adjusting a high pressure let-down valve for complete closing of the valve plug against the valve seat.

It has been found that in addition to the foregoing advantages, that when using a high pressure let-down valve in an ethylene polymerization process, the number of process shutdowns for valve maintenance and adjustment is decreased and the number of decompositions which periodically occur in the process are reduced.

The distance that piston limit stop 21 moves with each tooth rotation of ratchet gear 22 is usually from about 0.003 to 0.004 inch although any movement of the piston limit stop from about 0.001 inch to about 0.01 inch is within the scope of the invention. Ratchet gear 22 rotates one tooth for each full stroke of piston 33 in air motor 34 and this is measured as an angular rotation of ratchet gear 22 of about 15°. The number of adjustments available is dictated by the amount of travel each adjustment provides and the length of threaded area 20 of elongated sleeve 19 in contact with adjusting collar 13. It is desirable to have from about 50 to about 500 adjustments possible, with approximately 100 and 300 the preferred number.

Besides the manufacture of polyethylene at high pressures wherein a high pressure throttling valve is used, the apparatus of this invention can be used with high pressure valves employed in the production at high pressures of other polymers such as ethylene/vinyl acetate copolymers, other ethylene copolymers and other chemicals such as ammonia and methanol.

The high pressure throttling valve with which the adjusting apparatus of this invention is employed can be any high pressure throttling-type valve in which the valve plug closes against a valve seat to terminate flow. An example of this is the high pressure diaphragm valve manufactured by the Fisher Governor Company.

From the standpoint of safety in an industrial plant, an air motor is generally considered the most desirable actuator to use to rotate the ratchet mechanism and adjust the piston limit stop. However, any other type of drive such as electrical or stream can be used on the apparatus of this invention.

What is claimed is:

1. An apparatus for adjusting the extent of travel of the valve stem of a throttling valve including a shaft adapted for connection to said valve stem, said apparatus comprising a first fluid actuator means having a movable barrier means within a fluid tight casing, said barrier means being movable under the influence of a fluid pressure differential to impart reciprocating motion to said shaft, an elongated sleeve means adjustably threaded into the wall of said fluid tight casing for receiving said shaft, one end of said elongated sleeve means being a stop means in spaced relation to one end of said fluid tight casing to limit the extent of movement of said shaft by direct contact with said barrier means and the other end of said elongated sleeve means being a driving means for threadably adjusting said elongated sleeve means along the length of said shaft and thereby change the spaced relation of said stop means within said fluid tight casing, said driving means being a ratchet gear means enclosed by a rotatable housing having fixed therein a ratchet pawl in movable contact with said ratchet gear for rotation of said elongated sleeve means, and a second fluid actuator means mechanically coupled to said driving means to threadably adjust said elongated sleeve means as desired.

2. The apparatus of claim 1 wherein each engagement of said ratchet pawl in said ratchet gear results in the rotation of said elongated sleeve means 15°.

3. The apparatus of claim 2 wherein the said elongated sleeve means is adjusted longitudinally along said shaft of said piston a distance of 0.001 inch to 0.01 inch for each rotation of said ratchet gear equivalent to 15°.

References Cited by the Examiner
UNITED STATES PATENTS

| 796,925 | 8/1905 | McDermott | 92—13 X |
| 1,466,399 | 8/1923 | Hudson et al. | 92—13 X |
| 1,876,822 | 9/1932 | Mansure | 251—30 X |
| 2,532,847 | 12/1950 | Junkin | 251—60 |
| 2,547,029 | 4/1951 | Loungway | 92—13 X |
| 2,847,032 | 8/1958 | Fleming | 92—13 X |
| 2,918,040 | 12/1959 | Lieser | 92—13 |

M. CARY NELSON, *Primary Examiner.*